(12) United States Patent
Huston, III

(10) Patent No.: US 10,044,751 B2
(45) Date of Patent: Aug. 7, 2018

(54) USING RECURRENT NEURAL NETWORKS TO DEFEAT DNS DENIAL OF SERVICE ATTACKS

(71) Applicant: Arbor Networks, Inc., Burlington, MA (US)

(72) Inventor: Lawrence B. Huston, III, Ann Arbor, MI (US)

(73) Assignee: Arbor Networks, Inc., Burlington, MA (US)

( * ) Notice: Subject to any disclaimer, the term of this patent is extended or adjusted under 35 U.S.C. 154(b) by 100 days.

(21) Appl. No.: 14/981,738

(22) Filed: Dec. 28, 2015

(65) Prior Publication Data
US 2017/0187747 A1   Jun. 29, 2017

(51) Int. Cl.
*H04L 29/06*   (2006.01)
*G06N 3/02*   (2006.01)
*H04L 29/12*   (2006.01)

(52) U.S. Cl.
CPC ............ *H04L 63/1458* (2013.01); *G06N 3/02* (2013.01); *H04L 63/1416* (2013.01); *H04L 63/1441* (2013.01); *H04L 61/1511* (2013.01)

(58) Field of Classification Search
USPC ..................................................... 726/22
See application file for complete search history.

(56) References Cited

U.S. PATENT DOCUMENTS

| | | | | |
|---|---|---|---|---|
| 5,182,794 A | * | 1/1993 | Gasperi | G06N 3/08 706/25 |
| 5,680,481 A | * | 10/1997 | Prasad | G06K 9/00281 382/118 |
| 7,814,038 B1 | * | 10/2010 | Repici | G06N 3/08 706/25 |

(Continued)

OTHER PUBLICATIONS

A tutorial on training recurrent neural networks, covering BPPT, RTRL, EKF and the "echo state network" approach, Herbert Jaeger Fraunhofer Institute for Autonomous Intelligent Systems (AIS) since 2003: International University Bremen; First published: Oct. 2002; First revision: Feb. 2004; Second revision: Mar. 2005.*

(Continued)

*Primary Examiner* — Taghi Arani
*Assistant Examiner* — Badri Champakesan
(74) *Attorney, Agent, or Firm* — Locke Lord LLP; Scott D. Wofsy; Christopher J. Capelli

(57) ABSTRACT

A system for mitigating network attacks is provided. The system includes a protected network including a plurality of devices. The system further includes one or more attack mitigation devices communicatively coupled to the protected network. The attack mitigation devices are configured and operable to employ a recurrent neural network (RNN) to obtain probability information related to a request stream. The request stream may include a plurality of at least one of: HTTP, RTSP and/or DNS messages. The attack mitigation devices are further configured to analyze the obtained probability information to detect one or more atypical requests in (Continued)

the request stream. The attack mitigation services are also configured and operable to perform, in response to detecting one or more atypical requests, mitigation actions on the one or more atypical requests in order to block an attack.

16 Claims, 4 Drawing Sheets

(56) References Cited

U.S. PATENT DOCUMENTS

| | | | | |
|---|---|---|---|---|
| 8,254,681 | B1* | 8/2012 | Poncin | G06F 17/27 382/173 |
| 8,442,813 | B1* | 5/2013 | Popat | G06K 9/344 382/228 |
| 8,561,187 | B1* | 10/2013 | Hegli | H04L 63/1491 726/22 |
| 9,406,016 | B2* | 8/2016 | Pino | G06N 3/02 |
| 9,432,331 | B1* | 8/2016 | Shavell | H04L 63/02 |
| 9,432,385 | B2* | 8/2016 | Kustarz | H04L 63/1408 |
| 9,495,633 | B2* | 11/2016 | Davis | G06F 21/564 |
| 9,641,544 | B1* | 5/2017 | Treat | H04L 63/1425 |
| 2004/0015461 | A1* | 1/2004 | Lo | G06N 3/02 706/25 |
| 2008/0262990 | A1* | 10/2008 | Kapoor | G06F 9/505 706/20 |
| 2010/0188419 | A1* | 7/2010 | Ratnakar | G06K 9/033 345/619 |
| 2010/0278191 | A1* | 11/2010 | Gupta | H04L 63/1458 370/419 |
| 2010/0322071 | A1* | 12/2010 | Avdanin | H04L 43/0894 370/230 |
| 2011/0214157 | A1* | 9/2011 | Korsunsky | G06F 21/55 726/1 |
| 2011/0238855 | A1* | 9/2011 | Korsunsky | G06F 21/55 709/231 |
| 2012/0128251 | A1* | 5/2012 | Petrou | G06F 17/30253 382/182 |
| 2012/0240185 | A1* | 9/2012 | Kapoor | H04L 63/1425 726/1 |
| 2012/0278890 | A1* | 11/2012 | Maatta | H04L 63/1425 726/23 |
| 2013/0298192 | A1* | 11/2013 | Kumar | G06F 21/52 726/3 |
| 2013/0304684 | A1* | 11/2013 | Yufik | G06N 3/08 706/20 |
| 2015/0033335 | A1* | 1/2015 | Zhao | H04L 63/1416 726/22 |
| 2015/0350174 | A1* | 12/2015 | Reno | H04L 67/10 726/3 |
| 2016/0294871 | A1* | 10/2016 | Huston, III | H04L 63/1458 |
| 2016/0307094 | A1* | 10/2016 | Davis | G06F 21/564 |
| 2016/0328661 | A1* | 11/2016 | Reese | G06N 99/005 |
| 2016/0350652 | A1* | 12/2016 | Min | G06F 17/24 |
| 2017/0026295 | A1* | 1/2017 | Yin | H04L 43/0894 |
| 2017/0070531 | A1* | 3/2017 | Huston, III | H04L 63/1458 |
| 2017/0076195 | A1* | 3/2017 | Yang | G06N 3/04 |
| 2017/0093863 | A1* | 3/2017 | Galtsev | H04L 63/10 |
| 2017/0154245 | A1* | 6/2017 | Osindero | G06K 9/6256 |
| 2017/0169332 | A1* | 6/2017 | Graves | G06N 3/082 |
| 2017/0169357 | A1* | 6/2017 | Caspi | G06N 99/005 |
| 2017/0249432 | A1* | 8/2017 | Grantcharov | G06F 19/3406 |

OTHER PUBLICATIONS

A Learning Algorithm for Continually Running Fully Recurrent Neural Networks. Ronald J. Williams and David Zipser Posted Online Mar. 13, 2008; doi: 10.1162/neco.1989.1.2.270; © 1989 Massachusetts Institute of Technology; Neural Computation; vol. 1 | Issue 2 | Jun. 1989; p. 270-280.* http://ieeexplore.ieee.org/abstract/document/363441/?reload=true; Diagonal recurrent neural networks for dynamic systems control; Published in: IEEE Transactions on Neural Networks ( vol. 6, Issue: 1, Jan. 1995 ); pp. 144-156; Date of Publication: Jan. 1995.*

* cited by examiner

US 10,044,751 B2

USING RECURRENT NEURAL NETWORKS TO DEFEAT DNS DENIAL OF SERVICE ATTACKS

FIELD OF THE INVENTION

Embodiments of the present elate generally to computer networks, and specifically to using Recurrent Neural Networks (RNNs) to defeat Domain Name System (DNS) denial of service attacks.

BACKGROUND OF THE INVENTION

The growing problems associated with security exploits within the architecture of the Internet are of significant concern to network providers. Networks and network devices are increasingly affected by the damages caused by Denial of Service ("DoS") attacks. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

A Distributed Denial of Service (DDos) is a more aggressive action that involves multiple offensive devices performing an attack on a single target computer network or system. This attack may be performed in a coordinated manner by these multiple external devices to attack a specific resource of a service provider network. The targeted resource can be any networking device such as routers, Internet servers, electronic mail servers, Domain Name Servers (DNS) servers, etc. Examples of DDoS attack include (but are not limited to): large quantities of raw traffic designed to overwhelm a resource or infrastructure; application specific traffic designed to overwhelm a particular service; traffic formatted to disrupt a host from normal processing; traffic reflected and/or amplified through legitimate hosts; traffic originating from compromised sources or from spoofed IP addresses; and pulsed attacks (which start/stop attacks). Further, it is to be understood DDoS attacks are typically categorized as: Transmission Control Protocol (TCP) Stack Flood Attacks (e.g., flood a certain aspect of a TCP connection process to keep the host from being able to respond to legitimate connections (which may also be spoofed)); Generic Flood Attacks (e.g., consists of a flood of traffic for one or more protocols or ports, which may be designed to appear like normal traffic which may also be spoofed)); Fragmentation Attacks (e.g., consists of a flood of TCP or UDP fragments sent to a victim to overwhelm the victim's ability to re-assemble data streams, thus severely reducing performance); Application Attacks (e.g., attacks designed to overwhelm components of specific applications); Connection Attacks (e.g., attacks that maintain a large number of either ½ open TCP connections or fully open idle connections); and Vulnerability Exploit Attacks (e.g., attacks designed to exploit a vulnerability in a victim's operating system).

Dictionary attacks are commonly used by hackers in DDoS attacks, target backend servers by sending invalid lookup requests. As a result, the attack directly taxes the backend servers, consuming computational resources of backend servers and causing outages of the backend servers. Therefore, the ability to securely avoid or mitigate these attacks, while preventing blocking of valid hosts is advantageous to devices located in a protected network.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a system for mitigating network attacks is provided. The system includes a protected network including a plurality of devices. The system further includes one or more attack mitigation devices communicatively coupled to the protected network. The attack mitigation devices are configured and operable to employ a recurrent neural network (RNN) to obtain probability information related to a request stream. The request stream may include a plurality of at least one of: HTTP (hypertext transfer protocol), RTSP (Real Time Streaming Protocol) and/or DNS messages. The attack mitigation devices are further configured to analyze the obtained probability information to detect one or more atypical requests in the request stream. The attack mitigation services are also configured and operable to perform, in response to detecting one or more atypical requests, mitigation actions on the one or more atypical requests in order to block an attack.

In another aspect, an attack mitigation device communicatively coupled to a protected network is provided. The attack mitigation device includes logic integrated with and/or executable by a processor. The logic is adapted to obtain probability information related to a request stream using a RNN. The request stream includes a plurality of at least one of: HTTP, RTSP and/or DNS messages. The logic is further adopted to analyze the obtained probability information to detect one or more atypical requests in the request stream. The logic is yet further adopted to perform, in response to detecting the one or more atypical requests, one or more mitigation actions on the one or more atypical requests in order to block an attack.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
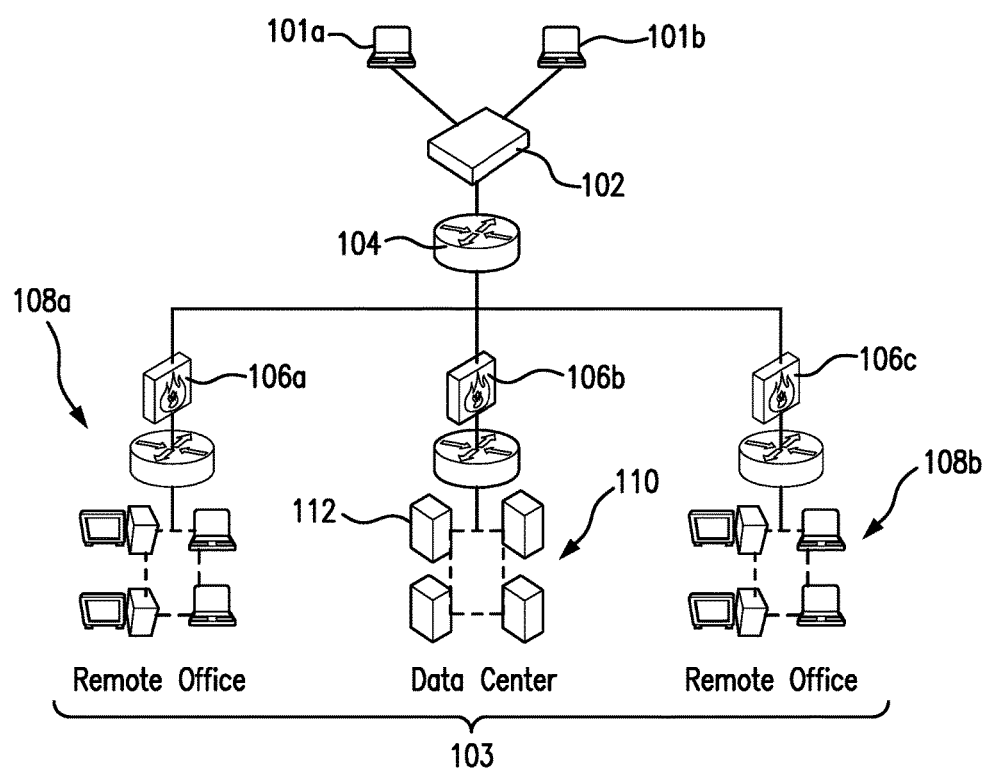
FIG. 1 is a schematic diagram showing network architecture and the relationship between the attack mitigation device and protected network according to one embodiment of the present invention.

The present invention is now described more fully with reference to the accompanying drawings, in which illustrated embodiments of the present invention are shown wherein like reference numerals identify like elements. The present invention is not limited in any way to the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

In accordance with an illustrated embodiment of the present invention, reference is now made to FIG. 1 which is an exemplary and non-limiting diagram illustrating a network architecture to which embodiments of the present invention are applicable. In the illustrated embodiment of FIG. 1, one or more external devices 101a, 101b communicate with a protected network 103 and specifically one or more devices within one of the remote offices 108a, 108b and/or a server within a data center 110. In the illustrated example, the external devices 101a, 101b may connect to a destination device using an attack mitigation device 102. The protected network 103 includes a plurality of devices/servers to be protected from malicious threats.

It is to be understood and appreciated the attack mitigation computing device 102 typically resides at a customer's premises but could reside elsewhere. In accordance with an illustrated embodiment of the present invention, the attack mitigation device 102 is configured to process traffic received from the external devices 101a, 101b for the purpose of mitigating DoS and DDoS attacks, as well as other types of attacks such as intrusion attempts and malware distribution against the protected network 103. For example, the external device 101a may carry out the malicious attacks against the DNS server 112, and particularly DNS dictionary attacks (hereinafter "dictionary attack"). The DNS server 112 typically receives requests that include a domain name of a website (e.g., example.com). The DNS server 112 responds to the device 101 with the corresponding IP address (e.g. 1.1.1.1), so that the external device 101 may access the website. DNS servers 112 may handle millions of requests every hour from many different external devices 101. The large volume may make detecting a DoS or DDoS attack on a DNS server 112 problematic, because it may be difficult to separate the malicious requests from the legitimate requests. When the external device 101a launches a dictionary attack against a protected DNS server 112, the external device 101 sends lookup requests for domains that look valid but are not (i.e., aardvark.example.com, apple.example.com, antelope.example.com, etc.). It should be noted that the embodiments disclosed herein are applied when multiple external devices exist, thus multiple attack tools may execute dictionary attacks against the DNS server 112 within the protected data center 103. To block these attacks, conventional DDoS protection solution needs an ability to separate the malicious requests from the legitimate requests. Thus, the conventional DDoS protection solutions are ill-suited to mitigate large scale dictionary attacks.

Advantageously, the embodiments disclosed herein offer a novel approach that can detect and mitigate a large scale dictionary attack campaign where a vast number of attack tools participate in attacking the protected network 103, i.e., the DNS server 112. As discussed further below, the attack mitigation device 102 is configured to utilize a neural network, such as RNN, to inspect the request stream received from the external devices 101a, 101b, identify one or more atypical requests and to drop traffic belonging to an attack. In various embodiments, the request stream may include DNS, HTTP, RTSP messages and the like. In a preferred embodiment, the attack mitigation device 102 is configured to detect a potential dictionary attack by determining if incoming request stream from the external devices 101 is suspected of including atypical requests by monitoring traffic addressed to the destination device (i.e., server 112). The attack mitigation device 102 can be configured to detect dictionary attacks based on (but not limited to) a trained RNN. According to an embodiment of the present invention, the attack mitigation device 102 is also configured and operable to train the RNN in either off-line or live phase by feeding such RNN with a large number of previously received requests. It is to be understood and appreciated the attack mitigation device 102 is preferably configured and operable to identify and block malicious incoming traffic based on the probability of having unlikely characters in a particular received request string.

According to exemplary configuration illustrated in FIG. 1, the attack mitigation device 106 may be communicatively coupled to a Client Edge (CE) device 104. The CE device 104 can provide entry points into the protected enterprise core network 103. Example edge devices can include routers, routing switches, integrated access devices (IADs), multiplexers, and a variety of metropolitan area network (MAN) and wide area network (WAN) access devices. The CE device 104 can be deployed inline in one of several modes. In one example, the CE device 104 can be deployed as a customer premises equipment (CPE) device in a branch that is capable of serving as a router. In some examples, the CE device 104 may comprise a gateway node. Generally, a gateway can be a network node equipped for interfacing with another network utilizing different communication protocols. In other words, the CE device 104 may serve, for example, as an aggregation point linking multiple remote offices 108a, 108b, data center 110 and/or other components of the protected enterprise network 103. As shown in FIG. 1, a plurality of firewall security devices 106a-106c ("firewall" for short) may be coupled between the CE device 104 and various portions (i.e., remote office 108, data center 110) of the protected enterprise network 103. The firewall devices 106a-106c may be configured to prevent unauthorized users from accessing various devices/computers (i.e., DNS server 112) within the protected network 103.

In alternative configuration, the attack mitigation device 102 may comprise a virtual device. In other words, at least some of the embodiments do not require the attack mitigation device 102 to be a physical hardware device or to be located in a particular part of the network infrastructure, as long as the attack mitigation device 102 can be in the path of the incoming traffic to the protected network 103.

Figure 2:
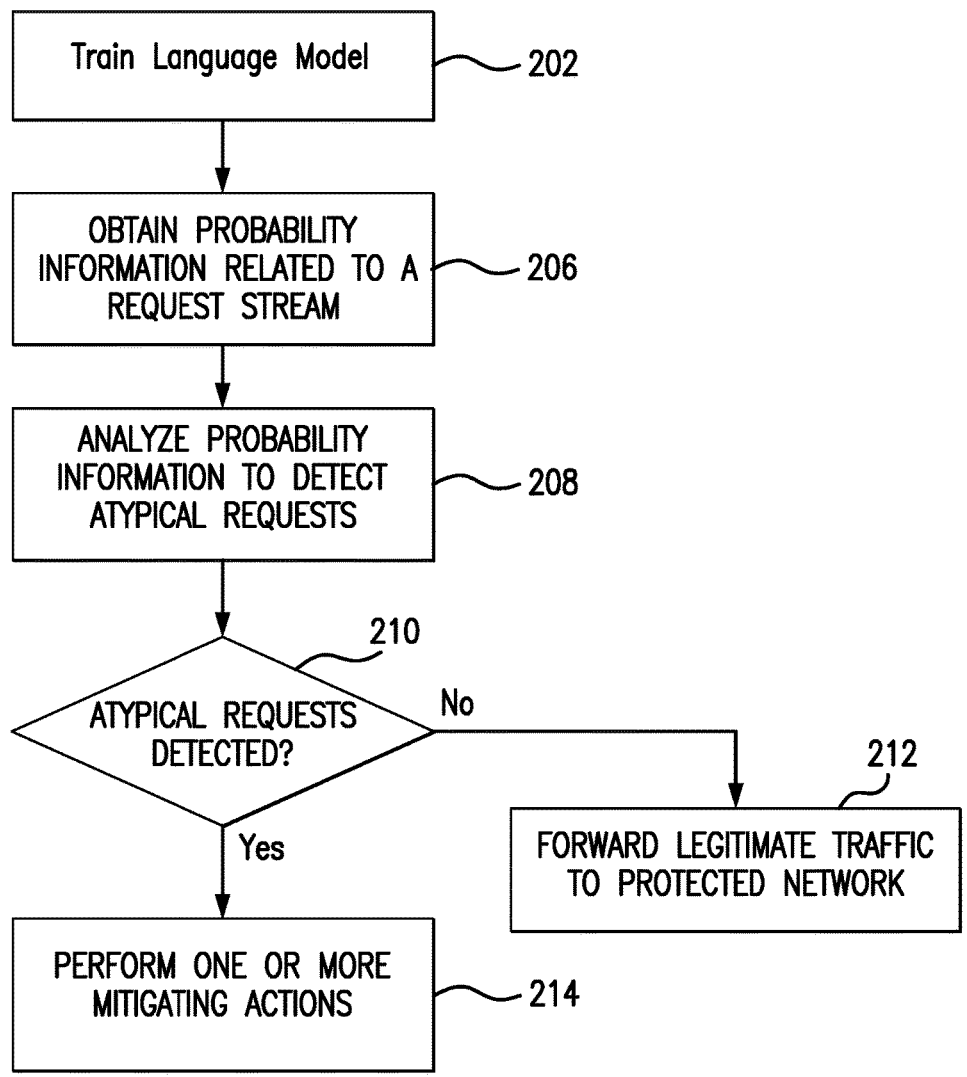
FIG. 2 is a flowchart illustrating a method in accordance with the illustrated embodiments.

FIG. 2 shows an exemplary and non-limiting flowchart illustrating a method for mitigating network attacks in accordance with certain illustrated embodiments. Before turning to description of FIG. 2, it is noted that the flow diagram in FIG. 2 shows example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

In one aspect, there is described a detection mechanism for atypical requests in an incoming request stream. The candidate requests are filtered into typical and atypical requests based at least in part on a language model. Advantageously, such language model may be built using a RNN. According to an embodiment of the present invention, at step 202, the language model is trained, for example, by the attack mitigation device 102. For example, such training may comprise feeding the language model by a plurality of preselected good "seed" requests from a large database of requests 430 (shown in FIG. 4). In other words, the language model is trained in an unsupervised fashion on, any suitable database 430 of requests. Notably, in one embodiment, the parameters of the language model (i.e., weight values) may be trained in an offline fashion. Alternative embodiment of the present invention allows an online learning of the RNN-based language model described herein.

According to an embodiment of the present invention, the attack mitigation device 102 may implement any of a number of variants of a backpropagation through time (BPTT) methods known in the art to teach the RNN. The concept behind BPTT method is to unfold the recurrent network in time into a cascade of identical copies of itself, where recurrent connections are re-arranged such that they lead from one copy of the network to the next. For example, if a given request is a request of 5 characters, the network would be unrolled into a 5-layer neural network, one layer for each character. This "unfolded" network is, technically, a feedforward network and can be taught by suitable variants of teaching methods for feedforward networks. This way of teaching RNNs inherits the iterative, gradient-descent nature of standard backpropagation, and multiplies its intrinsic cost with the number of copies used in the "unfolding" scheme.

Figure 3:
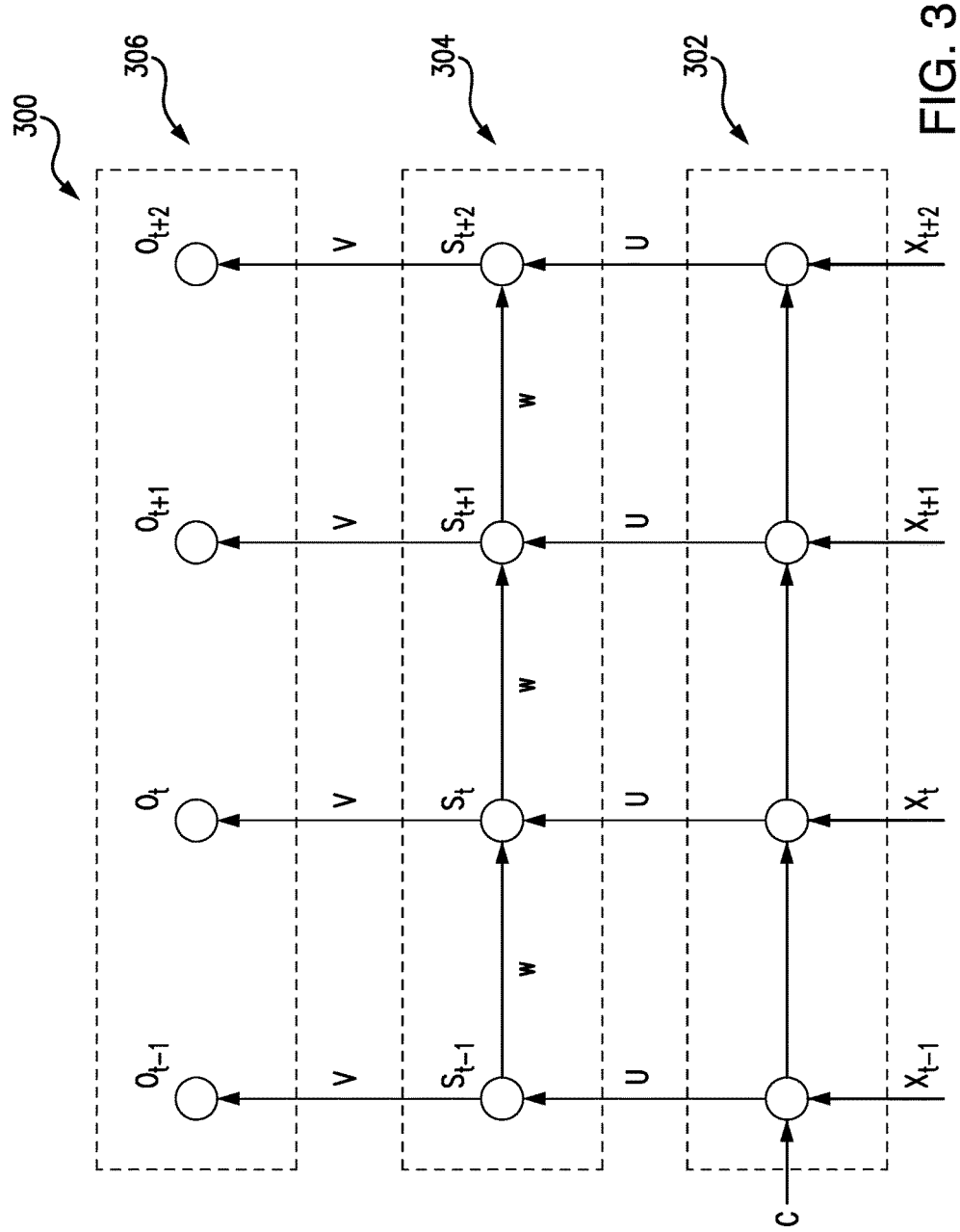
FIG. 3 shows an example of a neural network used in an embodiment of the present invention.

Referring now to FIG. 3, FIG. 3 shows an example of a neural network that can used in an embodiment of the present invention. A language model that may be built using the depicted RNN enables the attack mitigation device 102 to predict the probability of observing the character (in a given request) as:

$$P(c_1, \ldots, c_m) = \Pi_{i=1}^{m} P(c_i | c_1, \ldots, c_{i-1}). \qquad (1)$$

In words, the probability of a character in a given request is the product of probabilities of each character given the characters that came before it. For example, assume that the external device 101a makes a DNS request for the IP address of the domain name, i.e., www.example.com. According to formula (1), the probability of the request string "www.example.com" would be the probability of 'm' given "www.example.co", multiplied by the probability of 'o' given "www.example.c", and so on. Thus, RNN 300 substantially models the sequential dependencies in a sequence of characters in a given request stream.

The exemplary recurrent network structure 300 shown in FIG. 3 includes an input layer 302, an output layer 306 and also a hidden layer 304. Each layer represents a set of neurons (sometimes also referred to as nodes), and the layers are connected with weights. The input layer 302 represents input characters ($x_{t-1}$, $x_t$, $x_{t+1}$ and $x_{t+2}$) at time steps t−1, t, t+1 and t+2, respectively. For example, $x_1$ could be a vector corresponding to the second character of a request. It is noted that input vectors may be encoded using one-hot encoding, for example. A general discussion of one-hot encoding may be found in Alfke, Peter, "Accelerate FPGA Macros with One-hot Approach", Electronic Design, Sep. 13, 1990. The hidden layer 304 maintains a representation of the sequential character history. For example, $s_t$ is the hidden state at time step t. Effectively, the hidden layer 304 represents the "memory" of the network. It is noted that the RNN structure 300 may comprise a plurality of hidden layers, each hidden layer having an associated forward weight matrix. According to an embodiment of the present invention, the hidden state $s_t$ is calculated based on the previous hidden state and the input at the current step using the following formula:

$$s_t = f(Ux_t + Ws_{t-1}) \qquad (2)$$

where U and W are the learned parameters, such as, but not limited to connection weights. The output layer 306 produces probabilities for each possible character. For example, $o_t$ represents the output at step t. Each $o_t$ is a vector of elements, wherein each element represents the probability of that character being the next character in the request string. Thus, the attack mitigation device 102 can predict the next character in a given request string via a following softmax operation:

$$o_t = \text{softmax}(Vs_t) \qquad (3)$$

The softmax function generally is used to transform the outputs of a neural network's hidden layer so that all the output values fall between 0 and 1. Accordingly, in the language model represented by RNN 300 $s_t$ captures information about what happened (what characters were detected) in all the previous time steps. The output at step $o_t$ of the output layer 306 is calculated by the language model solely based on the memory at time step t. In other words, this model uses an on-line decoding process that outputs predictions of characters in a request stream based on only the past observations.

According to an embodiment of the present invention, the language model 300 shown in FIG. 3 may comprise an optimizing predictive model. In machine learning, an optimizing predictive model is a computational model that learns a function of its input values. One type of optimizing predictive model applies a stochastic gradient descent optimization technique over a loss function. Typically, the optimization procedure involves iteratively executing the model, and then differentiating the model to adapt the values of the model parameters (U, V and W) to minimize the loss function. The complexity of such a computation task is typically at least proportional to the size of the model. Therefore, it is desirable to have a model that is smaller, and which requires fewer computational operations.

A neural network model is usually based on a graph consisting of nodes (neurons) and directed, weighted edges that connect the neurons. The directed graph typically represents the function that is to be computed in the computational model. In a typical implementation, each neuron is assigned a simple computational task and the loss function is computed over the entire neural network model. Again, the parameters of the neural network model are typically determined ("learned") using a method that minimizes the loss function. Stochastic gradient descent is a method that is often used to achieve the minimization. In stochastic gradient descent, optimization is achieved iteratively by (a) finding analytical gradients for the loss functions and (b) perturbing or moving the test values by a small amount in the direction of the gradient, until the loss function is minimized.

Referring back to FIG. 2, at step 206, the attack mitigation device 102 obtains probability information related to a request stream using the RNN-based language model 300 described above. In the illustrative embodiment, the probability information related to the request stream may comprise language-conditional character probabilities for each character included in a particular request of the request stream received by the attack mitigation device 102. In addition, at step 206, the attack mitigation device 102 may generate a total request probability for each received request. The total probability may be generated by multiplying probabilities of each character contained within the request string. The total request probability represents a likelihood of the respective request string being a valid one.

Next, at step 208, the attack mitigation device 102 may analyze the total request probability information corresponding to each request to make a determination if the inbound traffic is suspected of including any atypical requests, such as randomly generated requests, for example. In one embodiment, the attack mitigation device 102 can identify atypical/abnormal requests by comparing the generated request probability with a pre-defined threshold. As a non-limiting example, the attack mitigation device 102 can be configured to classify all requests having probability lower than 20% (pre-defined threshold) as atypical requests.

According to an embodiment of the present invention, at step 210, the attack mitigation device 102 inspects the results of the analysis performed in step 208 to determine whether one or more atypical requests are detected or suspected. In response to finding no atypical requests (decision block 210, "no" branch), at step 212, the attack mitigation device 102 forwards legitimate clean traffic by means of the CE device 104 to the destination device (i.e., DNS server 112).

In response to detecting any atypical requests (decision block 210, "yes" branch), the attack mitigation device 102 then takes an appropriate action to mitigate the malicious network activity (step 214). For example, the attack mitigation device 102 may block all requests determined to be invalid (atypical). According to an alternative embodiment of the present invention, at step 214, the attack mitigation device 102 may also determine whether a source associated with a particular atypical request has sent other suspicious requests. If so, the attack mitigation device 102 may determine a rate of atypical requests sent by the same source. In this embodiment, if such rate exceeds a predefined threshold, the attack mitigation device 102 may block the corresponding source. In other words, one mitigation action may include blocking all offending hosts.

According to yet another embodiment of the present invention, at step 214, the attack mitigation device 102 may also compute a total rate of the received atypical requests in a particular request stream for a particular time period. If the computed rate exceeds a predefined rate (threshold), the attack mitigation device 102 may drop all requests that exceed the predefined rate. It is noted that in this embodiment, the attack mitigation device 102 may employ any known method for data traffic smoothing, such as, but not limited to a token bucket method. To implement this method the attack mitigation device 102 may periodically generate tokens, which fall figuratively into a bucket. With the method, a specific number of atypical requests can pass through the attack mitigation device 102 for one token in the bucket, the token being deleted or removed from the bucket when the number of atypical requests provided has passed through. The number of invalid/atypical requests that can pass through the attack mitigation device 102 per token corresponds to the predefined rate (threshold). This can generally be set by changing the time period of newly generated tokens. In other words, the aforementioned mitigation action may effectively keep the offending requests under an acceptable threshold.

Figure 4:
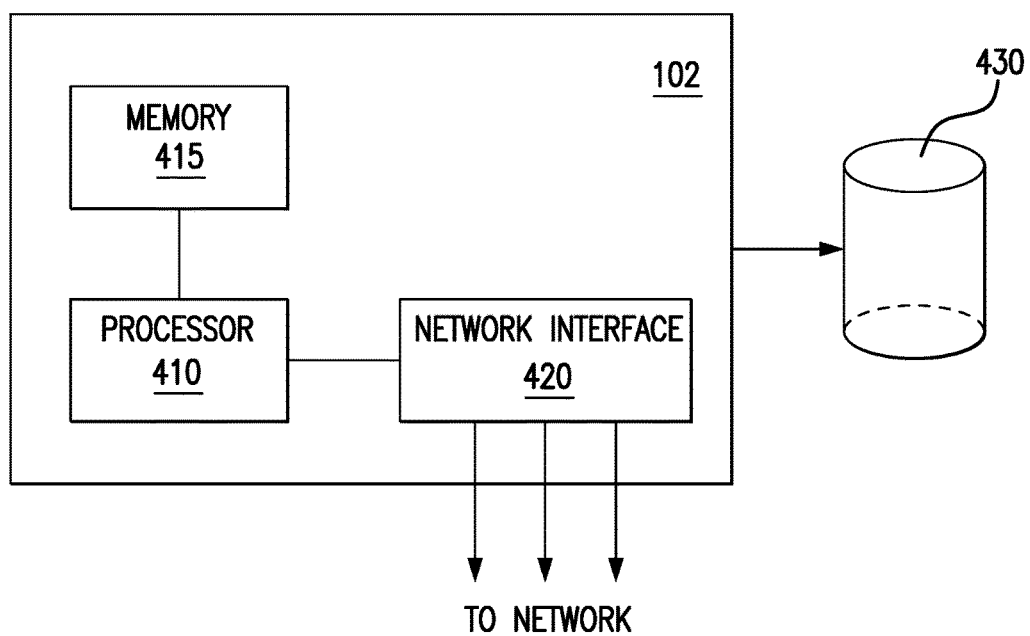
FIG. 4 is a block diagram of the attack mitigation device of FIG. 1, in accordance with an embodiment of the present invention.

With reference now to FIG. 4, illustrated is an exemplary and non-limiting block diagram of the attack mitigation device 102 constructed according to an illustrated embodiment. The attack mitigation device 102 is communicatively coupled to the protected network 103 and to the database 430 (i.e., training database of valid requests), as shown in FIG. 4, and is at least configured to execute the method for mitigating network attacks as described in greater detail above. The attack mitigation device 102 preferably includes a processor 410 coupled to a memory 415 and a network-interface module 420. The network-interface module 420 allows the communication with the protected network 103. The processor 410 uses instructions stored in the memory 415 to execute attack detection tasks as well as to control and enable the operation of the network-interface module 420.

In summary, various embodiments of the present invention disclose a novel approach to avoid or mitigate dictionary attacks by employing a neural network. The disclosed approach provides a number of advantages. In one aspect, software programming code embodying the present invention provides an ability to detect a malicious attack by merely monitoring incoming request stream rather than monitoring entire traffic. In another aspect, using this approach, the attack mitigation device 102 determines the likelihood of the received request being a valid one based on historical information. As yet another advantage, although the method depicted in FIG. 2 is described with reference to the DNS protocol, it is not limited thereto. The requests processed by the attack mitigation device 102 may comprise HTTP and/or RTSP protocol messages, for example.

Most preferably, the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for mitigating network attacks, the system comprising:
a protected network comprising a plurality of devices; and
one or more attack mitigation devices communicatively coupled to the protected network, wherein the one or more attack mitigation devices are configured and operable to employ a recurrent neural network (RNN) programmed to use a Backpropagation Through Time (BPTT) method to obtain total request probability information related to a request stream, wherein the request stream comprises a plurality of at least one of: HTTP (hypertext transfer protocol), RTSP (Real Time Streaming Protocol) and/or DNS (Domain Name System protocol) messages and wherein the total request probability information represents a probability of a respective request message string being a valid one and wherein the total request probability information related to the request stream is obtained by multiplying language-conditional character probabilities for each character included in the request message; analyze the obtained total request probability information using the BPTT method to detect one or more atypical requests in the request stream and perform, in response to detecting the one or more atypical requests, one or more mitigation actions on the one or more atypical requests in order to block an attack including: (1) determining a rate at which a source associated with a particular atypical request sends atypical requests and (2) blocking the source in response to determining that the rate exceeds a predefined threshold.

2. The system as recited in claim 1, wherein the one or more attack mitigation devices is further configured to train the employed RNN by presenting the RNN with preselected valid request samples from a database.

3. The system as recited in claim 1, wherein the atypical request comprises a randomly generated request.

4. The system as recited in claim 1, wherein the RNN models sequential dependencies in a sequence of characters included in each request message.

5. The system as recited in claim 2, wherein the one or more attack mitigation devices is further configured to train the employed RNN in at least one of off-line phase and live phase.

6. The system as recited in claim 1, wherein the one or more mitigation actions further comprise:
determining a total rate of the received atypical requests in the request stream; and
dropping the one or more atypical requests in response to determining that the total rate exceeds a predefined threshold.

7. The system as recited in claim 6, wherein the determination that the total rate exceeds the predefined threshold is made using a token bucket rate technique.

8. The system as recited in claim 1, wherein the attack comprises a dictionary DDoS attack.

9. An attack mitigation device communicatively coupled to a protected network, the attack mitigation device comprising logic integrated with and/or executable by a processor, the logic being adapted to:
obtain total request probability information related to a request stream using a recurrent neural network (RNN) programmed to use a Backpropagation Through Time (BPTT) method, the request stream comprising a plurality of at least one of: HTTP (hypertext transfer protocol), RTSP (Real Time Streaming Protocol) and/or DNS (Domain Name System protocol) messages, the total request probability information represents a probability of a respective request message string being a valid one;
analyze the obtained total request probability information to detect one or more atypical requests in the request stream using the BPTT method; and
perform, in response to detecting the one or more atypical requests, one or more mitigation actions on the one or more atypical requests in order to block an attack including: (1) determining a rate at which a source associated with a particular atypical request sends atypical requests and (2) blocking the source in response to determining that the rate exceeds a predefined threshold.

10. The attack mitigation device as recited in claim 9, wherein device is further coupled to a database and wherein the logic is further adapted to train the RNN by presenting the RNN with preselected valid request samples from the database.

11. The attack mitigation device as recited in claim 9, wherein the atypical request comprises a randomly generated request.

12. The attack mitigation device as recited in claim 9, wherein the RNN models sequential dependencies in a sequence of characters included in each request message.

13. The attack mitigation device as recited in claim 10, wherein the logic is further adapted to train the employed RNN in at least one of off-line phase and live phase.

14. The attack mitigation device as recited in claim 9, wherein the logic adopted to perform one or more mitigation actions is further adapted to:
   determine a total rate of the received atypical requests in the request stream; and
   drop the one or more atypical requests in response to determining that the total rate exceeds a predefined threshold.

15. The attack mitigation device as recited in claim 9, wherein the determination that the total rate exceeds the predefined threshold is made using a token bucket rate technique.

16. The attack mitigation device as recited in claim 9, wherein the attack comprises a dictionary DDoS attack.

* * * * *